US012637362B2

(12) United States Patent
Lantto et al.

(10) Patent No.: US 12,637,362 B2
(45) Date of Patent: May 26, 2026

(54) PROCESS FOR PREPARING BATTERY GRADE METAL SULPHATE SOLUTIONS

(71) Applicants: NORTHVOLT AB, Stockholm (SE); METAL TRADE OVERSEAS AG, Sug (CH)

(72) Inventors: Cornelia Lantto, Enskede (SE); Tom Niemi, Karleby (FI); Pekka Alisaari, Somero (FI); Esa Lindell, Pori (FI); Rauno Luoma, Pori (FI); Tuomo Laukkanen, Sampu (FI); Pekka Tynjälä, Joensuu (FI); Ulla Lassi, Kempele (FI)

(73) Assignees: NORTHVOLT AB, Stockholm (SE); METAL TRADE OVERSEAS AG, Zug (CH)

( * ) Notice: Subject to any disclaimer, the term of this patent is extended or adjusted under 35 U.S.C. 154(b) by 0 days.

(21) Appl. No.: 18/044,043

(22) PCT Filed: Sep. 7, 2021

(86) PCT No.: PCT/EP2021/074545
§ 371 (c)(1),
(2) Date: Mar. 3, 2023

(87) PCT Pub. No.: WO2022/053448
PCT Pub. Date: Mar. 17, 2022

(65) Prior Publication Data
US 2023/0312368 A1      Oct. 5, 2023

(30) Foreign Application Priority Data
Sep. 9, 2020    (EP) ..................................... 20195318

(51) Int. Cl.
*C01G 53/10*        (2006.01)
*C22B 3/00*         (2006.01)

(52) U.S. Cl.
CPC ............ *C01G 53/10* (2013.01); *C22B 23/043* (2013.01); *C01P 2006/80* (2013.01)

(58) Field of Classification Search
CPC .... C01G 53/10; C22B 23/043; C01P 2006/80
(Continued)

(56) References Cited

U.S. PATENT DOCUMENTS 4,071,611 A * 1/1978 Chilson ..................... C22B 3/04
                                                            423/41
5,250,273 A * 10/1993 Hornsey .................. C22B 3/04
                                                            423/28
(Continued)

FOREIGN PATENT DOCUMENTS

CA        822608 A      11/1969
CA        826608 A      11/1969
(Continued)

OTHER PUBLICATIONS

Sandin, S., et al. "Catalyzed and uncatalyzed decomposition of hypochlorite in dilute solutions." Ind. Eng. Chem. Res. 2015, 54, 15, 3767-3774 (Year: 2015).*
(Continued)

*Primary Examiner* — Anthony J Zimmer
*Assistant Examiner* — Zachary John Baum
(74) *Attorney, Agent, or Firm* — Zilka-Kotab, P.C.

(57)                ABSTRACT
Battery grade metal sulfate solutions can be prepared directly from electrolytically produced metal objects, such as cathode plates, when these are subjected to an aqueous leaching solution comprising at least one acid leaching agent and a liquid oxidizing agent in a continuous process at elevated temperature and with vigorous mixing. A leaching arrangement comprising a leaching column or reaction vessel is also disclosed.

18 Claims, 4 Drawing Sheets

(58) Field of Classification Search
USPC .......................................................... 423/544
See application file for complete search history.

(56) References Cited

U.S. PATENT DOCUMENTS

| | | | | |
|---|---|---|---|---|
| 6,149,885 A | * | 11/2000 | Makino | C22B 23/0453 |
| | | | | 423/139 |
| 7,364,717 B2 | | 4/2008 | Fierro et al. | |
| 7,799,296 B2 | | 9/2010 | Fetcenko et al. | |
| 9,321,656 B2 | | 4/2016 | Schroedle et al. | |
| 9,416,023 B2 | | 8/2016 | Schroedle et al. | |
| 2015/0151981 A1 | | 6/2015 | Schroedle et al. | |

FOREIGN PATENT DOCUMENTS

| | | | | | |
|---|---|---|---|---|---|
| CA | 2008063 | A1 | | 7/1991 | |
| CN | 104532295 | A | | 4/2015 | |
| CN | 107739059 | A | * | 2/2018 | |
| EP | 3967661 | A1 | | 3/2022 | |
| FR | 2513904 | A1 | | 4/1983 | |
| GB | 2104053 | A | * | 3/1983 | C01G 51/085 |
| JP | 63-045131 | A | | 2/1988 | |
| JP | S63-45131 | A | | 2/1988 | |
| JP | 2011-126757 | A | | 6/2011 | |
| JP | 2019-179699 | A | | 10/2019 | |
| SU | 385927 | A1 | * | 6/1973 | |
| WO | WO 2009146485 | A1 | * | 12/2009 | |
| WO | WO-2014/009208 | A1 | | 1/2014 | |

OTHER PUBLICATIONS

English translation of CN 107739059 A Description (Year: 2018).*
English translation of SU 385927 A1 Description (Year: 1973).*
Extended European Search Report for European Patent Application No. 21142380, dated Sep. 22, 2023, (7 pages), European Patent Office, Munich, Germany.
Extended European Search Report for European Patent Application No. 20195318.9, dated Mar. 6, 2021, (10 pages), European Patent Office, Stockholm, Sweden.
Communication Pursuant to Article 94(3) EPC for European Patent Application No. 20195318.9, dated Apr. 21, 2022, (34 pages), European Patent Office, Stockholm, Sweden.
Communication Pursuant to Article 94(3) EPC for European Patent Application No. 20195318.9, dated Sep. 2, 2022, (5 pages), European Patent Office, Stockholm, Sweden.
Communication Pursuant to Article 94(3) EPC for European Patent Application No. 20195318.9, dated Dec. 12, 2022, (3 pages), European Patent Office, Stockholm, Sweden.
Communication Under Rule 71(3) EPC for European Patent Application No. 20195318.9, dated Mar. 9, 2023, (51 pages), European Patent Office, Stockholm, Sweden.
Decisison to Grant a European Patent Pursuant to Article 97(1) EPC for European Patent Applicaton No. 20195318.9, dated Jun. 29, 2023, (3 pages), European Patent Office, Stockholm, Sweden.
"Countercurrent Tower Process Gold Leaching," 911 Mettalurgist, (6 pages), available online: <URL: https://www.911metallurgist.com/countercurrent-tower-process-gold-leaching/#:~:text=The%20Kamyr%20countercurrent%20tower%20leach,the%20bottom%20of%20the%20tower>.
YouTube. "How to Dissolve US Nickels (H2SO4 Method)," The Chemistry Shack, Oct. 13, 2015, (4 pages), available online: <URL: https://www.youtube.com/watch?v=wAQuQhR7jzl>.
YouTube. "How to Make Nickel Sulfate Safely—A Nickel Plating Solution Ingredient," Garage Science, Jun. 20, 2019, (9 pages), available online: <URL: https://www.youtube.com/watch?v=2_jZCHQAPS4>.
Green, Don W. et al. "Leaching," Perry's Chemical Engineers' Handbook, 9th Edition, Sections 18-55, 18-66, 18-59, 18-60, (7 pages).

Engh, T. Abel et al. "Properties of the Various Metals," Principles of Metal Refining, (Year: 1992), pp. 134, 143, 144, 147, Oxford University Press Inc., New York, ISBN: 0-19-856337-X.
International Search Report and Written Opinion for International Application No. PCT/EP2021/074545, dated Dec. 22, 2021, (12 pages), European Patent Office, Rijswijk, Netherlands.
Bilczuk, Dario, et al., "Kinetic Study of the Dissolution of Metallix Nickel in Sulphuric Acid Solutions in the Presence of Different Oxidants", The Canadian Journal of Chemical Engineering, (34 pages), Feb. 11, 2016, DOI 10.1002/cjce.22576.
Martin, Rod, "Ageing of Composites", Woodhead Publishing Limited, (27 pages), 2008.
FRP Material Selection Guide: An Engineer's Guide to FRP Technology, Reichhold, Inc., (77 pages), 2009.
Martin, R., "Ageing of Composites in the Chemical Processing Industry", Woodhead Publishing Limited, Chapter 17, (19 pages), 2008.
"Nickel Plating Handbook", Nickel Institute, (35 pages), 2014.
Sanli, A., et al., "Electrochemistry of The Nickel Electrode as a Cathode Catalyst in the Media of Acidic Peroxide for Applicatin of The Peroxide Fuel Cell", The Electrochemical Society, (20 pages, Feb. 21, 2017.
"Controlling the Electroplating Process", Nickel Institute, Chapters 9-13, (27 pages), Feb. 2014.
Lascelles, K, et al., "Processing History at Vale Europe's (Inco's) Nickel Refinery in Clydach", CIM Journal, vol. 4, No. 4, pp. 242-256, (2013).
"Engineering and Functional Nickel Coatings", Nickel Institute, Chapters 6-8, (18 pages), Feb. 2014.
Umicore, Statement of Facts and Arguments in Support of Opposition for European Application No. 20195318.9, dated Apr. 25, 2024, 66 pages.
Umicore, Notice of Opposition to a European Patent for application No. 20195318.9, dated Apr. 25, 2024, 7 pages, European Patent Office.
Acknowledgement of Receipt of Notice of Opposition for European Patent Application No. 20195318.9, dated Apr. 25, 2024, 2 pages, European Patent Office.
Acknowledgement of Receipt of Notice of Opposition for European Patent Application No. 20195318.9, dated Apr. 26, 2024, 2 pages, European Patent Office.
Notice of Opposition to a European Patent for Application No. 20195318.9, dated Apr. 26, 2024, 4 pages, European Patent Office.
Onsagers AS, Notice of Oppostion for European Patent Application No. 20195318.9, dated Apr. 26, 2024, 27 pages.
Communication of a Notice of Opposition for European Patent Application No. 20195318.9, dated May 6, 2024, 105 pages, European Patent Office, Munich, Germany.
Communication of Further Notices of Opposition Pursuant to Rule 79 (2) EPC, for European Patent Application No. 20195318.9, dated May 15, 2024, 3 pages, European Patent Office, Munich, Germany.
Communication of Notices of Opposition (R. 79 (1) EPC), for European Patent Application No. 20195318.9, dated May 15, 2024, 2 pages, European Patent Office, Munich, Germany.
European Patent Office, Consolidated Exhibit D1: CRF171 version previously in effect on Sep. 8, 2020, EPO's Consolidated Exhibit List dated Apr. 26, 2024 for Umicore and Glencore Nikkelverk AS Oppositions dated Apr. 24, 2024 and Apr. 26, 2024, respectively, 26 pages.
European Patent Office, Consolidated Exhibit D2: Technical report, Margot Neven, EPO's Consolidated Exhibit List dated Apr. 26, 2024 for Umicore and Glencore Nikkelverk AS Oppositions dated Apr. 24, 2024 and Apr. 26, 2024, respectively, 6 pages.
European Patent Office, Consolidated Exhibit D4: U.S. Pat. No. 5,250,273A, EPO's Consolidated Exhibit List dated Apr. 26, 2024 for Umicore and Glencore Nikkelverk AS Oppositions dated Apr. 24, 2024 and Apr. 26, 2024, respectively, 16 pages.
European Patent Office, Consolidated Exhibit D5: The Economics of Nickel, EPO's Consolidated Exhibit List dated Apr. 26, 2024 for Umicore and Glencore Nikkelverk AS Oppositions dated Apr. 24, 2024 and Apr. 26, 2024, respectively, 508 pages.
European Patent Office, Consolidated Exhibit D6: WO2009146485Al, EPO's Consolidated Exhibit List dated Apr. 26, 2024 for Umicore

(56) References Cited

OTHER PUBLICATIONS and Glencore Nikkelverk AS Oppositions dated Apr. 24, 2024 and Apr. 26, 2024, respectively, 33 pages.

European Patent Office, Consolidated Exhibit D7: U.S. Pat. No. 7,364,717B2, EPO's Consolidated Exhibit List dated Apr. 26, 2024 for Umicore and Glencore Nikkelverk AS, Oppositions dated Apr. 24, 2024 and Apr. 26, 2024, respectively, _13 pages.

European Patent Office, Consolidated Exhibit D8: screen shot of first page "Recovery of copper by cementation on nickel powder", *Canadian Metallurgical Quarterly*, vol. 13, EPO's Consolidated Exhibit List dated Apr. 26, 2024 for Umicore and Glencore Nikkelverk AS Oppositions dated Apr. 24, 2024 and Apr. 26, 2024, respectively, 4 pages.

European Patent Office, Consolidated Exhibit D9: U.S. Pat. No. 3,902,896A, EPO's Consolidated Exhibit List dated Apr. 26, 2024 for Umicore and Glencore Nikkelverk AS Oppositions dated Apr. 24, 2024 and Apr. 26, 2024, respectively, 5 pages.

European Patent Office, Consolidated Exhibit D10: JP2011126757 A, EPO's Consolidated Exhibit List dated Apr. 26, 2024 for Umicore and Glencore Nikkelverk AS Oppositions dated Apr. 24, 2024 and Apr. 26, 2024, respectively, 12 pages.

European Patent Office, Consolidated Exhibit D10a: Machine translation of D10, EPO's Consolidated Exhibit List dated Apr. 26, 2024 for Umicore and Glencore Nikkelverk AS Oppositions dated Apr. 24, 2024 and Apr. 26, 2024, respectively, 17 pages.

European Patent Office, Consolidated Exhibit D11: U.S. Pat. No. 2,533,245A, EPO's Consolidated Exhibit List dated Apr. 26, 2024 for Umicore and Glencore Nikkelverk AS Oppositions dated Apr. 24, 2024 and Apr. 26, 2024, respectively, _7 pages.

European Patent Office, Consolidated Exhibit D12: U.S. Pat. No. 2015175438A1, EPO's Consolidated Exhibit List dated Apr. 26, 2024 for Umicore and Glencore Nikkelverk AS, Oppositions dated Apr. 24, 2024 and Apr. 26, 2024, respectively, 7 pages.

European Patent Office, Consolidated Exhibit D13: U.S. Pat. No. 6,554,915B2, EPO's Consolidated Exhibit List dated Apr. 26, 2024 for Umicore and Glencore Nikkelverk AS Oppositions dated Apr. 24, 2024 and Apr. 26, 2024, respectively, 12 pages.

European Patent Office, Consolidated Exhibit D14: Bilczuk, D. et al., "Kinetic Study of the Dissolution of Metallic Nickel in Sulphuric Acid Solutions in The Presence of Different Oxidants", *The Canadian Journal of Chemical Engineering*, vol. 9999, 1-8, EPO's Consolidated Exhibit List dated Apr. 26, 2024 for Umicore and Glencore Nikkelverk AS Oppositions dated Apr. 24, 2024 and Apr. 26, 2024, respectively, 8 pages.

European Patent Office, Consolidated Exhibit D15: GB2104053A, EPO's Consolidated Exhibit List dated Apr. 26, 2024 for Umicore and Glencore Nikkelverk AS Oppositions dated Apr. 24, 2024 and Apr. 26, 2024, respectively, _14 pages.

European Patent Office, Consolidated Exhibit D16: U.S. Pat. No. 7,799,296 B2, EPO's Consolidated Exhibit List dated Apr. 26, 2024 for Umicore and Glencore Nikkelverk AS Oppositions dated Apr. 24, 2024 and Apr. 26, 2024, respectively, 13 pages.

European Patent Office, Consolidated Exhibit D17: Expert opinion prof. Dreisinger, EPO's Consolidated Exhibit List dated Apr. 26, 2024 for Umicore and Glencore Nikkelverk AS Oppositions dated Apr. 24, 2024 and Apr. 26, 2024, respectively, 22 pages.

European Patent Office, Consolidated Exhibit D18: CN 107 739 059 A, EPO's Consolidated Exhibit List dated Apr. 26, 2024 for Umicore and Glencore Nikkelverk AS Oppositions dated Apr. 24, 2024 and Apr. 26, 2024, respectively, 9 pages.

European Patent Office, Consolidated Exhibit D18a: Machine translation of D18, EPO's Consolidated Exhibit List dated Apr. 26, 2024 for Umicore and Glencore Nikkelverk AS Oppositions dated Apr. 24, 2024 and Apr. 26, 2024, respectively, 13 pages.

European Patent Office, Consolidated Exhibit D19: Geng, S. et al., "Electrolytic production of Cu—Ni alloy from nickel matte through chlorination and deep eutectic solvent leachingelectrodeposition, Separation and Purification Technology", vol. 242, EPO's Consolidated Exhibit List dated Apr. 26, 2024 for Umicore and Glencore Nikkelverk AS Oppositions dated Apr. 24, 2024 and Apr. 26, 2024, respectively, _10 pages.

European Patent Office, Consolidated Exhibit D20: Djouani, R. et al. "Mechanism of electrodeposition of nickel in aqueous solution", *International Journal of Current Research*, vol. 10, No. 1, EPO's Consolidated Exhibit List dated Apr. 26, 2024 for Umicore and Glencore Nikkelverk AS Oppositions dated Apr. 24, 2024 and Apr. 26, 2024, respectively, 12 pages.

European Patent Office, Consolidated Exhibit D21: Laokhen P. et al., "Preliminary Study on Recovery of Nickel from Electro-Nickel-Plating Solution by Electrowinning", *J. Material Sci. Eng.*, vol. 8, No. 5, EPO's Consolidated Exhibit List dated Apr. 26, 2024 for Umicore and Glencore Nikkelverk AS Oppositions dated Apr. 24, 2024 and Apr. 26, 2024, respectively, 4 pages.

European Patent Office, Consolidated Exhibit D22: Mulaudzi et al., "Direct cobalt electrowinning as an alternative tointermediate cobalt mixed hydroxide product", *The Southern African Institute of Mining and Metallurgy Base Metals Conference*, EPO's Consolidated Exhibit List dated Apr. 26, 2024 for Umicore and Glencore Nikkelverk AS Oppositions dated Apr. 24, 2024 and Apr. 26, 2024, respectively, 14 pages.

European Patent Office, Consolidated Exhibit D23: Coulson J.M et al. "Chemical engineering", vol. 2, 3rd edition (SI units), Pergamom press, Reprinted (with revisions): 1985, p. 375-385, EPO's Consolidated Exhibit List dated Apr. 26, 2024 for Umicore and Glencore Nikkelverk AS Oppositions dated Apr. 24, 2024 and Apr. 26, 2024, respectively, _16 pages.

European Patent Office, Consolidated Exhibit D24: Kaskiala, T. et al. "Determination of oxygen solubility in aqueous sulphuric acid media, Minerals Engineering", 15, EPO's Consolidated Exhibit List dated Apr. 26, 2024 for Umicore and Glencore Nikkelverk AS Oppositions dated Apr. 24, 2024 and Apr. 26, 2024, respectively, 5 pages.

European Patent Office, Consolidated Exhibit D25: U.S. Pat. No. 3,777,003A, EPO's Consolidated Exhibit List dated Apr. 26, 2024 for Umicore and Glencore Nikkelverk AS Oppositions dated Apr. 24, 2024 and Apr. 26, 2024, respectively, 3 pages.

European Patent Office, Consolidated Exhibit D26: U.S. Pat. No. 3,958,947A EPO's Consolidated Exhibit List dated Apr. 26, 2024 for Umicore and Glencore Nikkelverk AS Oppositions dated Apr. 24, 2024 and Apr. 26, 2024, respectively, 9 pages.

European Patent Office, Consolidated Exhibit D27: Cybulski et al. Chapter 5: Process Development, Fine chemicals manufacture Technology and Engineering, 2001, Elsevier, p. 193-413 EPO's Consolidated Exhibit List dated Apr. 26, 2024 for Umicore and Glencore Nikkelverk AS Oppositions dated Apr. 24, 2024 and Apr. 26, 2024, respectively, 221 pages.

European Patent Office, Consolidated Exhibit D28: Couper et al., Chapter 14: Extraction and leaching, Chemical Process Equipment (Third edition), 2012, Elsevier, p. 487-528 EPO's Consolidated Exhibit List dated Apr. 26, 2024 for Umicore and Glencore Nikkelverk AS Oppositions dated Apr. 24, 2024 and Apr. 26, 2024, respectively, 42 pages.

European Patent Office, Consolidated Exhibit D29: Excerpts of Seader, Henley and Roper (2011), "Separation Process Principles Chemical and Biochemical Operations", 3rd Edition, John Wiley & Sons Inc.ISBN 978-0-470-48183-7 EPO's Consolidated Exhibit List dated Apr. 26, 2024 for Umicore and Glencore Nikkelverk AS Oppositions dated Apr. 24, 2024 and Apr. 26, 2024, respectively, _20 pages.

European Patent Office, Consolidated Exhibit D30: Excerpts of Foust et al. (1960), "Principles of Unit Operations", John Wiley & Sons, Inc., New York, EPO's Consolidated Exhibit List dated Apr. 26, 2024 for Umicore and Glencore Nikkelverk AS Oppositions dated Apr. 24, 2024 and Apr. 26, 2024, respectively, 6 pages.

European Patent Office, Consolidated Exhibit D31: Excerpt of Perry's Chemical Engineers Handbook, 9th Ed., 2019, EPO's Consolidated Exhibit List dated Apr. 26, 2024 for Umicore and Glencore Nikkelverk AS Oppositions dated Apr. 24, 2024 and Apr. 26, 2024, respectively, 25 pages.

European Patent Office, Consolidated Exhibit D32: CA 2,008,063 C1, EPO's Consolidated Exhibit List dated Apr. 26, 2024 for

(56)                    References Cited

OTHER PUBLICATIONS

Umicore and Glencore Nikkelverk AS Oppositions dated Apr. 24, 2024 and Apr. 26, 2024, respectively, _58 pages.

European Patent Office, Consolidated Exhibit D33: Appendix—Examples of use of the term battery grade, EPO's Consolidated Exhibit List dated Apr. 26, 2024 for Umicore and Glencore Nikkelverk AS Oppositions dated Apr. 24, 2024 and Apr. 26, 2024, respectively, 2 pages.

European Patent Office, Consolidated Exhibit D34: U.S. Pat. No. 9,321,656 EPO's Consolidated Exhibit List dated Apr. 26, 2024 for Umicore and Glencore Nikkelverk AS Oppositions dated Apr. 24, 2024 and Apr. 26, 2024, respectively, 5 pages.

European Patent Office, Consolidated Exhibit D35: U.S. Pat. No. 2,533,245, EPO's Consolidated Exhibit List dated Apr. 26, 2024 for Umicore and Glencore Nikkelverk AS Oppositions dated Apr. 24, 2024 and Apr. 26, 2024, respectively, 7 pages.

European Patent Office, Consolidated Exhibit D36: CA1210592, EPO's Consolidated Exhibit List dated Apr. 26, 2024 for Umicore and Glencore Nikkelverk AS Oppositions dated Apr. 24, 2024 and Apr. 26, 2024, respectively, 12 pages.

European Patent Office, Consolidated Exhibit D37: SU385927, EPO's Consolidated Exhibit List dated Apr. 26, 2024 for Umicore and Glencore Nikkelverk AS Oppositions dated Apr. 24, 2024 and Apr. 26, 2024, respectively, 2 pages.

European Patent Office, Consolidated Exhibit D37a: Machine translation of SU385927, EPO's Consolidated Exhibit List dated Apr. 26, 2024 for Umicore and Glencore Nikkelverk AS Oppositions dated Apr. 24, 2024 and Apr. 26, 2024, respectively, 3 pages.

Japanese Office Action for Application No. 2023-516189, dated Jul. 1, 2025, 30 pages.

* cited by examiner 167 g/l sulfuric acid + 167 ml/l hydrogen peroxide 100 g/l Ni + ca. 7 g/l sulfuric acid

PROCESS FOR PREPARING BATTERY GRADE METAL SULPHATE SOLUTIONS

CROSS REFERENCE TO RELATED APPLICATIONS

This application is a National Stage Application, filed under 35 U.S.C. § 371, of International Application No. PCT/EP2021/074545, filed Sep. 7, 2021, which international application claims priority to and the benefit of European Application No. 20195318.9, filed Sep. 9, 2020; the contents of both of which are hereby incorporated by reference in their entirety.

TECHNICAL FIELD

The present disclosure relates to the field of battery technology and the manufacture of batteries, and in particular to a process for preparing battery grade metal sulphate solutions suitable for use in the production of nickel, cobalt, and mixed metal cathode precursors.

BACKGROUND

The need for lithium-ion batteries is expected to grow exponentially over the next few years. Nickel (Ni) and cobalt (Co) are essential elements for the manufacture of lithium-ion batteries in which they are used as active cathode materials in the form of mixed metal oxides. With a growing use of lithium-ion batteries, the sourcing of raw materials becomes an issue that needs to be addressed.

In the production of batteries, the battery grade metal sulfate solutions, mainly nickel, cobalt and manganese sulfates, are currently mainly produced by dissolving metal sulfate crystals. In the alternative, the metals can be sourced in powder form, or as briquettes made by compressing the powder. These crystals, powders and briquettes are then dissolved—in a batch process—in sulfuric acid to produce battery grade metal sulfate solutions.

U.S. Pat. No. 7,364,717 B2 claims a process for converting bulk nickel metal to nickel sulfate comprising the steps of 1) providing at least one enclosed reactor column containing a bulk nickel metal; 2) adding sulfuric acid at a first pressure into each of said at least one enclosed reactor column, said sulfuric acid having a concentration sufficient to dissolve said bulk nickel metal; 3) supplying an oxygen containing gas at a second pressure above said first pressure after the sulfuric acid begins reacting with said bulk nickel metal thereby producing a nickel sulfate solution; and 4) collecting said nickel sulfate solution in a collection receptacle. This is principally a two-step process, as the oxidizing agent is added separately from the sulfuric acid, and only after the sulfuric acid has begun to react with the bulk metal. Additionally, the use of pressurized oxygen gas puts special requirements on the equipment used.

U.S. Pat. No. 9,416,023 B2 discloses a two-step process for preparing an aqueous cobalt sulfate solution having a pH of at least 4, the process comprising first (a) dissolving metallic cobalt in aqueous sulfuric acid in an atmosphere of hydrogen, of inert gas or of a nitrogen/oxygen mixture which comprises nitrogen and oxygen in a volume ratio of from 6:1 to 100:1, thereby obtaining an acidic cobalt sulfate solution, and then (b) treating the acidic cobalt sulfate solution with oxygen, oxygen-comprising gas or a substance releasing oxygen in an aqueous medium.

JP 63045131 (Sumitomo Metal Mining Co., published 1988 Feb. 26) discloses a cobalt plating bath where the leaching itself is performed without an oxidizing agent, and where hydrogen peroxide or sodium hypochlorite is added to the aqueous solution of dissolved cobalt sulfate.

WO 2014/009208 (BASF, published 2014 Jan. 16) teaches the dissolution of metallic cobalt in aqueous sulfuric acid in an atmosphere of hydrogen or inert gas or a mixture of nitrogen and low concentration of oxygen. The volume ratio nitrogen : oxygen is stated as 6:1-100:1, and preferably 23:1-80:1.

GB 2104053 (INCO Ltd., published 1983 Mar. 2) concerns the production of nickel and cobalt sulphates and chlorides, dissolving pieces of the respective metal in hot sulfuric or hydrochloric acid, but does not suggest the addition of an oxidizing agent to the leaching solution.

There is still a need for improving the process with regard to safety, economy, and efficiency.

SUMMARY

The present inventors have developed a new process for preparing battery grade metal sulfate solutions starting from electrolytically produced metal objects, such as metallic nickel and cobalt cathodes of different shapes and sizes. The process operates under comparatively mild conditions, uses only liquid reagents, and exhibits a surprising yield and quality of end product.

Consequently, according to a first aspect, the present disclosure relates to a process for preparing battery grade metal sulfate solutions, wherein electrolytically produced metal objects are subjected to an aqueous leaching solution at an elevated temperature and acid pH in a continuous process with mixing, said leaching solution comprising at least one acid leaching agent and an oxidizing agent in liquid form. Continuous here means that metal objects, leaching agent and oxidizing agent can be added and resulting battery grade metal sulphate solution withdrawn without interrupting the process.

According to a preferred embodiment, said mixing is achieved by recirculating the aqueous leaching solution through a leaching column operating in counter-current mode. Here recirculation means that the leaching solution is pumped around in a closed loop, exiting and re-entering a reaction vessel, that is, a part of the process equipment holding the electrolytically produced metal objects. Counter-current means that while the metal objects are introduced into a reaction vessel, for example a column, from one direction, the leaching solution is introduced into the reaction vessel from a substantially opposite direction. In an embodiment where the reaction vessel is a vertical or substantially vertical column, the metal objects are introduced from the top, and the leaching solution is recirculated so that it enters the column substantially from the bottom.

According to a preferred embodiment, the process is operated so that the resulting battery grade metal sulfate solution has a residual sulfuric acid concentration in the interval of 0-10 g/l, preferably 0-6 g/l.

According to an embodiment of the above process, the electrolytically produced metal objects are chosen from nickel cathode plates, squares, rounds, crowns and chippings and the resulting metal sulfate solution is a battery grade nickel sulfate solution.

According to another embodiment of the above process, the electrolytically produced metal objects are chosen from cobalt cathode plates, squares, rounds, crowns and chippings and the resulting metal sulfate solution is a battery grade cobalt sulfate solution.

According to an embodiment, freely combinable with any of the above aspects and embodiments, the acid leaching agent is selected from the group comprising sulfuric acid, hydrochloric acid, nitric acid, oxalic acid, citric acid, or a combination of at least two of these. Preferably the acid leaching agent is sulfuric acid.

According to another embodiment, freely combinable with any of the above aspects and embodiments, the oxidizing agent is selected from the group comprising hydrogen peroxide, halogens, and halogen compounds such as chlorates and perchlorates, citric acid, or oxalic acid. Preferably said oxidizing agent is hydrogen peroxide.

According to one embodiment, the leaching solution comprises a mixture of sulfuric acid and citric acid.

According to an embodiment, freely combinable with any of the above aspects and embodiments, the pH is maintained in an interval of 1-6, preferably in an interval of pH 1-4, more preferably in an interval of pH 1.5-3, and most preferably the pH is maintained at pH 2 +/−0.2.

According to an embodiment, again freely combinable with any of the above aspects and embodiments, the temperature is maintained at a temperature in an interval between 50° C. and up to 100° C., or up to the boiling point of the leaching solution, preferably between 75° C. and the boiling point of the leaching solution. According to one embodiment, the leaching solution is cooled or pressurized to prevent boiling.

As a result of the action of the leaching acid and the vigorous mixing achieved by the recirculation, the electrolytically produced metal objects eventually shrink due to dissolution, forming smaller particles, so called fines. Therefore, a step of separation of metal fines is preferably included in the process, a solid/liquid separation step, preferably a step of magnetic separation.

Another aspect of the present disclosure is an arrangement for performing the process disclosed herein, comprising at least one reactor vessel with a recirculation loop, a pump, a solid/liquid separator, inlets for the addition of leaching acid, oxidizing agent and electrolytically produced metal objects, and at least one outlet for removal of metal sulphate solution, wherein metal objects can be added, and battery grade metal sulphate solution removed without interruption of the process.

According to an embodiment of the second aspect, the reactor vessel is a substantially vertical column adapted for holding metal objects added at one end, and for receiving the recirculating leaching solution in a counter-current mode in relation to the direction of addition of the metal objects.

According to an embodiment the reactor vessel is made from a fiber reinforced polymer material.

As a consequence of the present leaching process and/or the use of the above arrangement, the choice of starting material and the improved possibilities to control the process, the resulting battery grade metal sulfate solution will have a very low sodium concentration, and a copper concentration in the ppm range. Also, the remaining concentrations of impurities such as iron and zinc will be very low, the exact values depending on the starting material and the chosen process parameters. Importantly, the resulting battery grade metal sulfate solution also has a low residual sulfuric acid concentration in the interval of 0-10 g/l, preferably 0-6 g/l, which constitutes an important parameter when determining the quality of battery grade metal sulfate solution.

BRIEF DESCRIPTION OF THE DRAWINGS

A more detailed disclosure will now be given, by way of example, with reference to the accompanying drawings, in which FIG. 1 schematically shows an arrangement used for small scale leaching tests of electrolytically produced metal objects, here exemplified by metallic cathodes.

DETAILED DESCRIPTION

Figure 1:
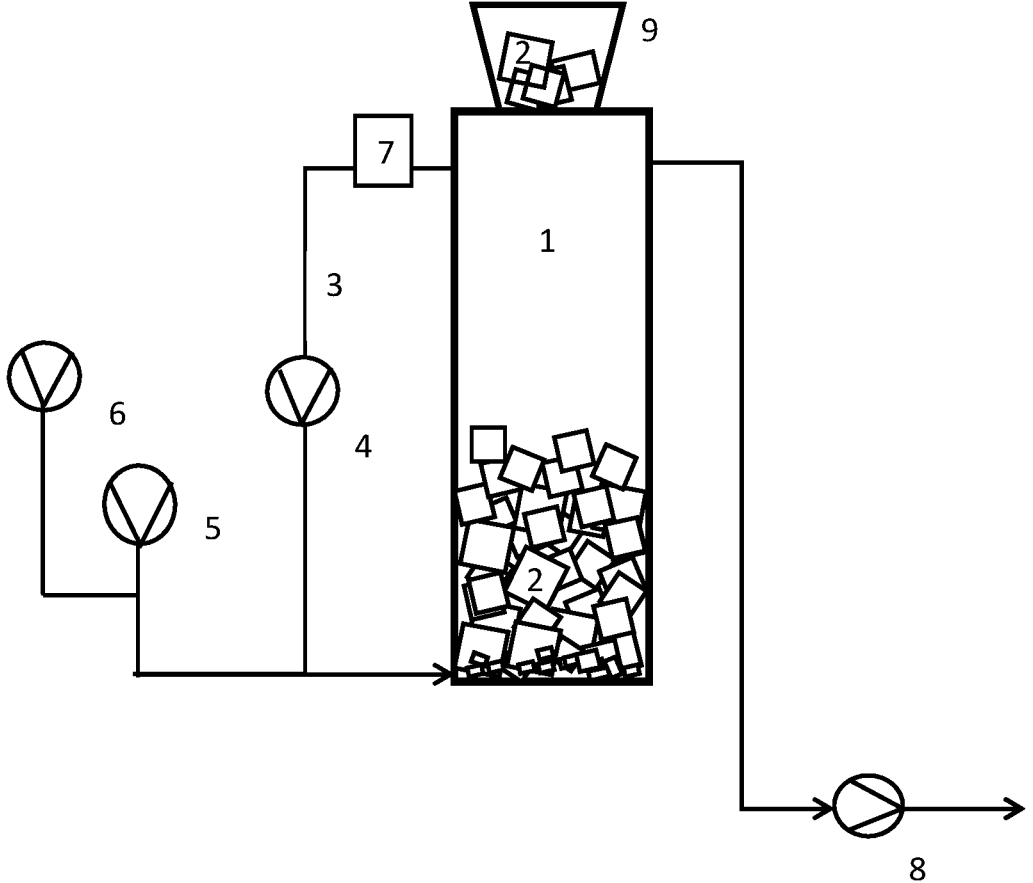
Figure 2:
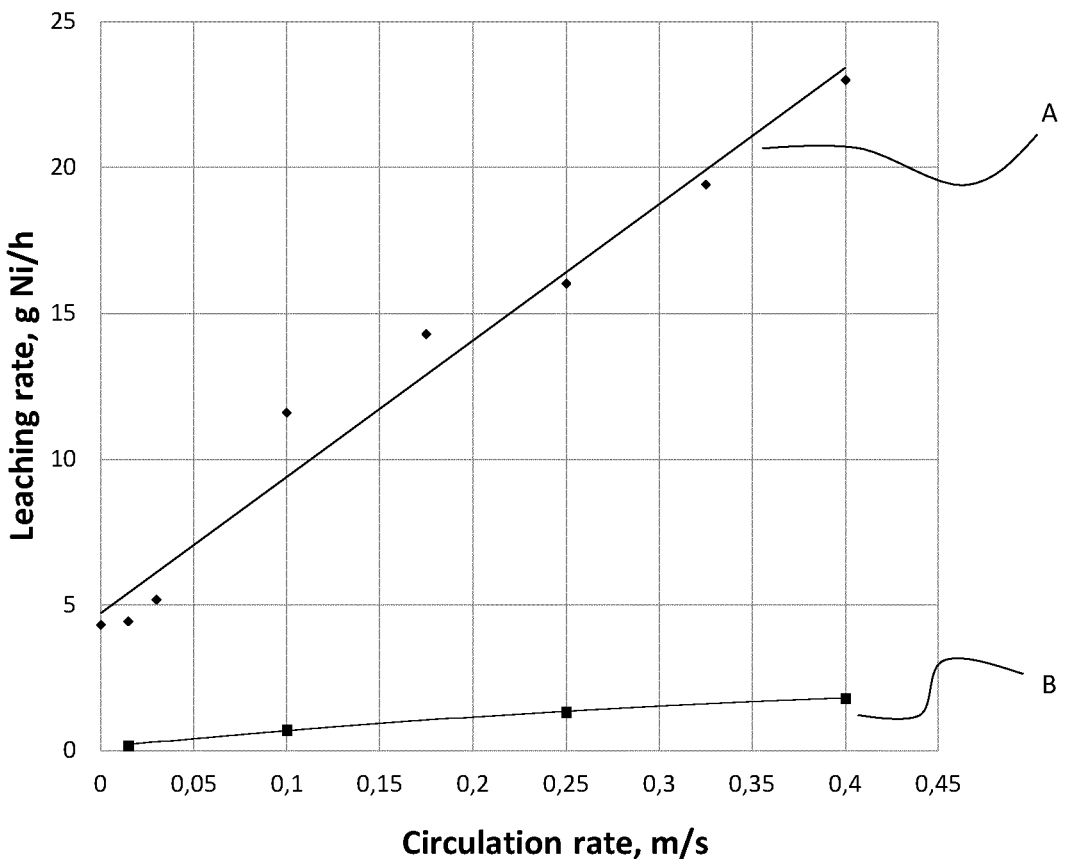
FIG. 2 is a graph showing the effect of circulation rate and sulfuric acid concentration on the leaching rate of nickel cathodes. To the left (A) the leaching rate is plotted against the circulation rate for nickel subjected to a mix of 167 g/l sulfuric acid and 167 ml/l hydrogen peroxide. To the right (B) the leaching rate is plotted against the circulation rate for a mix of 100 g/l Ni and 7 g/l sulfuric acid.
Figure 3:
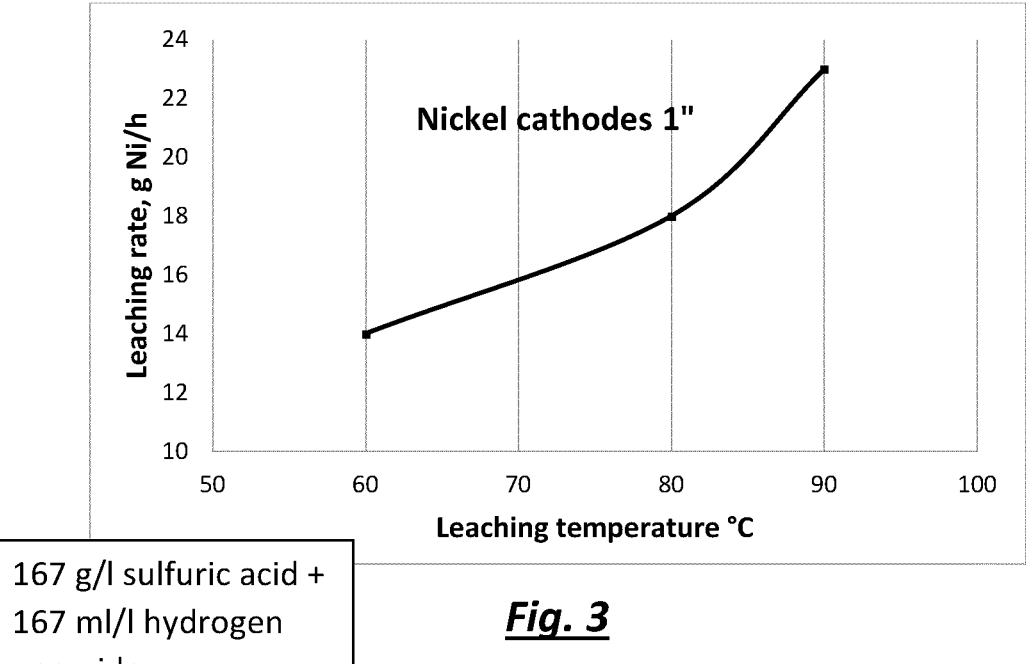
FIG. 3 is a graph showing the effect of leaching temperature on the leaching rate of nickel cathodes.
Figure 4:
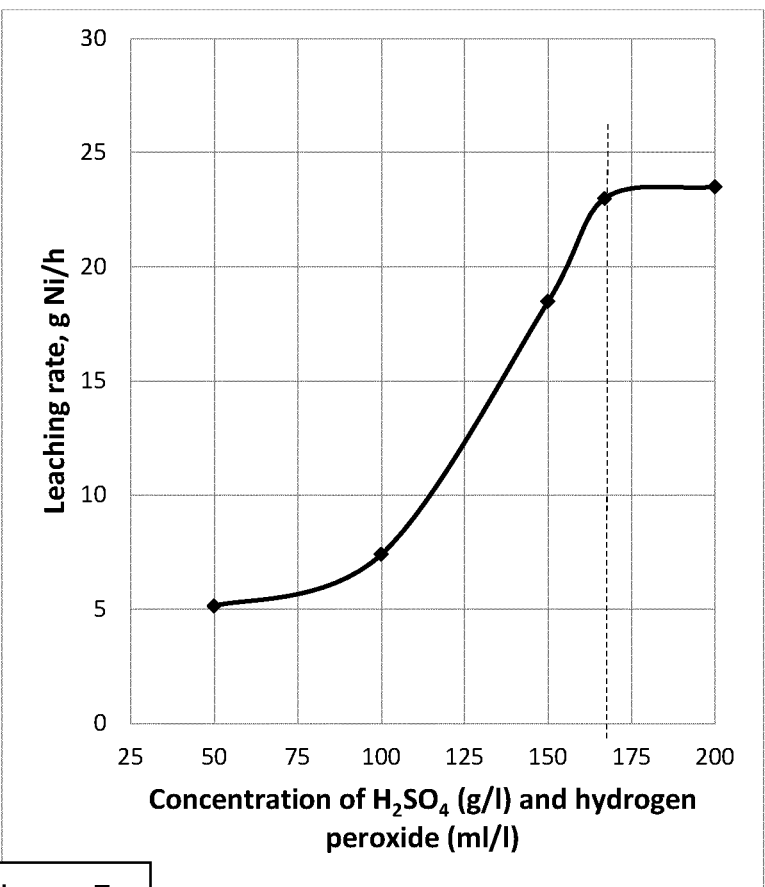
FIG. 4 is a graph showing the effect of the concentration of sulfuric acid and hydrogen peroxide on the leaching rate of nickel, expressed as g Ni/h at a circulation rate 0.4 m/s.

Before going into closer detail, it is to be understood that the terminology employed herein is used for the purpose of describing particular embodiments only and is not intended to be limiting, since the scope of the present disclosure will be limited only by the appended claims and equivalents thereof.

It must be noted that, as used in this specification and the appended claims, the singular forms "a," "an," and "the" include plural referents unless the context clearly dictates otherwise.

"Electrowinning" is a process where metals are recovered in an electrolytic cell. An aqueous solution containing metal sulphates is subjected to an electric potential, resulting in that metal cations are drawn to the surface of the negative pole, the cathode, where they are deposited as pure metal.

"Electrorefining" is a related process, where impurities are removed. Anodes comprising impure metal are subjected to an electric potential within an electrolytic cell, corroding the anodes into solution, and the refined, pure metal is deposited on the cathodes. Both electrowinning and electrorefining processes result in electrolytically produced metals on the cathode or forming the cathode and are available in different shapes.

The terms "plates, squares, rounds, crowns, tubes, and bars" refers to different geometrical shapes of the metallic cathode material.

"Battery grade" as used in "battery grade nickel sulfate" and "battery grade cobalt sulfate" refers to the quality, i.e. the level of impurities. Frequently, 99.9% purity is required. The exact specifications may vary depending on the intended use and the specifications of the batteries, but this term is nevertheless well understood by a person skilled in the art.

The term "continuous" is used as normally understood by a person skilled in the art. A process is considered continuous if starting materials can be added, and product collected without discontinuing the process. This does not exclude that also a continuous process is occasionally interrupted, for example for maintenance. A batch process on the other hand is characterized in that starting materials are added in specified amounts, and the process performed to produce a product and the products recovered, before a new batch can be processed.

The present inventors have identified a new starting material for the production of metal sulphate solutions and developed a new and improved process for preparing battery grade metal sulfate solutions, wherein electrolytically produced metal objects are subjected to an aqueous leaching solution at an elevated temperature and acid pH in a continuous process with mixing, said leaching solution comprising at least one acid leaching agent and an oxidizing agent in liquid form. The process can be also operated in batch mode, semi continuously, or continuously, but according to a preferred embodiment, the process is continuous, meaning that metal objects, leaching agent and optionally an oxidizing agent can be added, and resulting battery grade metal sulphate solution withdrawn without interruption of the process. Preferably metal objects, leaching agent and optionally an oxidizing agent are added, and resulting battery grade metal sulphate solution withdrawn without interruption of the process According to a preferred embodiment, the process is operated so that the resulting battery grade metal sulfate solution has a residual sulfuric acid concentration in the interval of 0-10 g/l, preferably 0-6 g/l. A person skilled in the art is familiar with the determination of residual sulfuric acid, for example by titration or using refractometry. A low sulfuric acid concentration is particularly advantageous when the metal sulphate solutions are intended for the manufacturing of active cathode materials for lithium-ion batteries. In the subsequent handling of the battery grade metal sulphate solutions, metal hydroxides (a precursor) are precipitated using ammonia and/or sodium hydroxide, so excess acid has to be neutralized either by using easily dissolvable metal powder or a neutralizing agent. For this reason, a low residual acid concentration is very advantageous.

According to an embodiment of the above process, the electrolytically produced metal objects are chosen from nickel cathode plates, squares, rounds and crowns and the resulting metal sulfate solution is a battery grade nickel sulfate solution.

According to another embodiment of the above process, the electrolytically produced metal objects are chosen from cobalt cathode plates, squares, rounds and crowns and the resulting metal sulfate solution is a battery grade cobalt sulfate solution.

It was highly surprising that electrolytically produced solid metal objects, such as cathode plates, squares, rounds and crowns could be used. Unlike metal sulfate crystals, metal powders and briquettes, solid metal objects are resistant to dissolution and leaching, and it could not be expected that they could be practically used for this purpose. When overcoming the practical difficulties, it was found that the use of electrolytically produced metal provides a minimum of impurities into the leaching process and obviates the need for subsequent purification steps.

It also constitutes an advantage of the process disclosed herein, that it allows the use of a new source of metal. In the primary production of nickel, cathodes constitute the biggest segment of the market, thus the availability is good. Conversely, the availability and price of metal sulphate crystals as well as the availability of metal powders and briquettes is sometimes a limiting factor, so enabling the use of a new starting material is a significant advantage.

Before the leaching process described herein, the electrolytically produced metal objects, for example cathode plates, are preferably cut, chopped or otherwise broken up into pieces of suitable size, fitting the apparatus or reaction vessel to be used. Metallic nickel or cobalt cathodes typically have a regular shape but can have also irregular shape. The cathodes used can be full-size cathodes or any other size and shape cut from the initial full plate or other shapes produced in an electrowinning or electrorefining process. Nickel or cobalt containing off-grade materials of any shape can also be considered as material suitable for the process in question.

Leaching can be used for recovering for example a value metal from a complex mixture, for example crushed ore in the mining industry, or crushed battery waste in the recovery of battery materials. It is therefore counterintuitive to use a pure metal as the starting material in a leaching process. A skilled person would not have considered using a pure metal as starting material in a leaching process, and if contemplating this, a skilled person would have been discouraged from trying because of the resistance to leaching exhibited by solid metals. In fact, prior art methods for leaching of solid metals, to the extent such methods are disclosed, generally involve very harsh conditions such as high concentrations of acid and oxidizing agents, high temperatures etc. and therefore require the use of enamel-clad vessels to resist corrosion. When the prior art methods rely on the use of pressurized gas, such as oxygen, this involves technical challenges such as the handling of pressurized gas, the mixing of gas into liquid, the need for reinforcement of reaction vessels etc. The use of gases, and in particular flammable gases such as hydrogen, also involves the risk of fire and explosion.

According to an embodiment, freely combinable with any of the above aspects and embodiments, the acid leaching agent is selected from the group comprising aqueous acids, such as but not limited to sulfuric acid, hydrochloric acid, nitric acid, oxalic acid, citric acid, or a combination of at least two of these. Preferably the acid leaching agent is sulfuric acid. Sulfuric acid is a widely used industrial chemical, readily available at reasonable cost, making the herein disclosed process both practical and affordable.

According to one embodiment, the leaching agent is a mixture of sulfuric acid and citric acid.

According to another embodiment, freely combinable with any of the above aspects and embodiments, the oxidizing agent is selected from the group comprising hydrogen peroxide, halogens and halogen compounds such as chlorates and perchlorates, citric acid or oxalic acid. Preferably said oxidizing agent is hydrogen peroxide. Hydrogen peroxide is also a widely used industrial chemical, most frequently used for the bleaching of pulp and paper, and it is available in large quantities. In a particular variant, the concentration of hydrogen peroxide is in a molar ratio range from 0.5 to 1.2 between hydrogen peroxide and sulfuric acid.

According to an embodiment, freely combinable with any of the above aspects and embodiments, the pH is maintained in an interval of 1-6, preferably in an interval of pH 1-4, more preferably in an interval of pH 1.5-3, and most preferably the pH is maintained at pH 2+/−0.2. At such a low pH, in combination with the elevated temperature, the presence of oxidizing agent and efficient mixing, for example by recirculation, the leaching proceeds with a surprisingly high speed, making the process practically applicable.

According to an embodiment, again freely combinable with any of the above aspects and embodiments, the temperature is maintained at a temperature in an interval between 50° C. and 100° C., or up to the boiling point of the leaching solution, preferably between 75° C. and the boiling point of the leaching solution. According to one embodiment, the leaching solution is cooled or pressurized to prevent boiling.

Preferably external heating can be applied when starting the process. The dilution of sulfuric acid as well as the leaching reaction itself are however exothermic reactions, and during operation also the recirculation pump will contribute to an increase in temperature. It is contemplated that a high production rate and a high recirculation rate will require cooling, whereas a low production rate as well as the start-up of the process, will require heating. Cooling and heating are preferably achieved using heat exchangers in the recirculation loop. The advantage of this is that by avoiding traditional methods of heating, such as the injection of steam, one also avoids the introduction of impurities, such as iron, frequently encountered in process waters. An additional advantage of the recirculation, disclosed by the present inventors, is that it redistributes the heat, produced by the exothermic reactions, throughout the system, reducing the need for specific cooling of the reaction vessel.

The mixing is achieved by recirculating the leaching solution, wherein recirculation means that the leaching solution is pumped around in a closed loop, exiting and re-entering a part of the process equipment holding the electrolytically produced metal objects. As a result of the action of the leaching acid and the vigorous mixing achieved by the recirculation, the electrolytically produced metal objects eventually dissolve and shrink, forming smaller sheet formed pieces and particles, so called fines.

The recirculation is preferably adjusted to a rate at which efficient mixing is achieved, and where the heat produced by the exothermic dissolution is removed from the reaction vessel or column. The recirculation flow rate is dependent of the scale of the column and apparatus, and a suitable flow rate can be determined by a person skilled in the art. Based on the experiments performed by the inventors, a flow rate can be chosen for example within the interval of 10-100 l/h, and is preferably about 50 l/h.

Preferably the recirculation is performed in a counter-current fashion. This means that when the electrolytically produced metal objects are loaded into a reaction vessel from one direction, for example from the top, the leaching solution is pumped into said vessel from the opposite direction, for example from the bottom. An advantage of this arrangement is that the leaching solution, optionally replenished with fresh acid and oxidizing agent, will first meet the most disintegrated metal objects and help to keep smaller parts or sheets and so-called fines within the reaction vessel. An inflow of leaching solution at the bottom of the reaction vessel will ensure good mixing, possibly creating an effect similar to that of a fluidized bed, causing the metal objects to swirl in the leaching solution and rub against each other.

Without wishing to be bound by theory, the inventors contemplate that the countercurrent recirculation as such also causes shearing and enhances leaching. The metal objects and fines will be subject to gravity, and by suitable adjustment of the rate of recirculation, all solids can be kept within the reaction vessel. Nevertheless, a step of separation of metal fines is preferably included in the process. Different devices for separating solids from liquids are commercially available, and include for example filters, decanters, wet scrubbers, hydrocyclones, centrifuges, and magnetic separators. Preferably said separation step is a magnetic separation step.

A magnetic separation step can be performed using a magnetic filter, for example magnetic elements such as rods or plates positioned in the flow path of the recirculating leaching solution. Metal fines adhere to the magnetic filter and are removed from the circulation. When the magnetic filter reaches its capacity, it can be removed and cleaned, either mechanically or manually. The collected fines can be subjected to further leaching, recovered or disposed, as desired. By arranging two magnetic filters in parallel, the flow can be diverted from one filter to another, and one filter being "cleaned" while the other is in operation. There are also semi-continuous magnetic separators available on the market. Preferably said filter/filters or separator/separators is/are positioned in the recirculation between the exit from the reaction vessel and the pump, thus minimizing the amount of fines that enter the pump.

According to a preferred embodiment, the step of separation of metal fines from the recirculating leaching solution includes the removal of copper wherein metallic copper is deposited on the metal fines and said fines are removed from circulation.

Another aspect of the present disclosure is an arrangement for performing the process disclosed herein, comprising at least one reactor vessel with a recirculation loop, a pump, a solid/liquid separator, inlets for the addition of leaching acid, oxidizing agent and electrolytically produced metal objects, and an outlet for removal of metal sulphate solution, wherein metal objects can be added, and metal sulphate solution removed without interrupting the process. In some variants, the vessel may also include an outlet for metal fines.

An example of such an arrangement is schematically shown in FIG. 1, schematically showing an arrangement comprising a reactor vessel (1) loaded with electrolytically produced metal objects (2) and a recirculation loop (3) with a recirculation pump (4) and pumps (5) and (6) for feeding leaching solution, for example a leaching acid and optionally an oxidizing agent and for pH control, respectively. A solid/liquid separator, for example a magnetic element (7) or magnetic filter for the separation of fines is also indicated. According to an embodiment, two magnetic elements or filters can be arranged in parallel. A pump (8) is provided for the withdrawal of $NiSO_4$ solution, preferably at a concentration of 100 g/l. The reactor vessel (1) is preferably a substantially vertical column. Optionally, a feeder (9) can be arranged in association with the reaction vessel (1) so that electrolytically produced metal objects (2) can be added continuously or semi-continuously during operation of the reactor.

While leaching has been applied to different raw materials containing metal, such as crushed ores, it is highly counter-intuitive to apply it to solid metal objects, such as in this case electrolytically produced solid metal objects, for example cathodes in the form of plates, squares, rounds, crowns, and bars. A skilled person would expect this to be inefficient and time consuming, and before the contribution of the present inventors, the leaching of solid metal objects was not considered an alternative.

As a consequence of the present leaching process, the resulting battery grade metal sulfate solution will have a low sodium concentration, and a copper concentration in the ppm range. Also, the remaining concentrations of iron and zinc will be very low, the exact values depending on the starting material and the chosen process parameters.

With reference to FIG. 1, a process can be conducted as follows: A substantially upright or vertical reactor vessel (1) is loaded with electrolytically produced metal objects (2) forming a bed of said metal objects. A leaching solution is fed into the system using a pump (5) and the pH controlled by metering a strong acid, for example sulfuric acid via a pump (6) in response to a pH measurement obtained from a sensor (not shown). The leaching solution is recirculated in counter-current mode through the bed of metal objects through a loop (3) and using a pump (4). The pH is adjusted as necessary. Optionally, a solid/liquid separator, such as a magnetic element or filter (7) for separating fines is arranged in the loop (3). Similarly, a heat exchanger (not shown) may be arranged in said loop for heating or cooling the leaching solution as necessary. A pump (8) is provided for withdrawing metal sulfate solution, for example nickel sulfate solution having a concentration of 100 g Nickel/l. A feeder (9) can be arranged for automatically feeding electrolytically produced metal objects (2) into the reactor (1) without interrupting the leaching process. The rate of feeding of metal objects, the addition of leaching agent and optional oxidizing agent, the temperature, pH and the rate of recirculation are adjusted so that a continuous output of metal sulphate solution meeting the desired quality parameters is achieved.

In the course of the leaching, the electrolytically produced metal objects, for example metallic nickel or cobalt cathodes, are treated with the leaching agent, preferably aqueous acid, selected from sulfuric acid, hydrochloric acid, nitric acid, oxalic acid, citric acid or a combination of at least two of foregoing, for example a combination of sulfuric acid and citric acid.

Preferably, the leaching agent is an aqueous acid, such as an inorganic or organic aqueous acid. The concentration of introduced fresh acid may be varied in a wide range, for example of 0.1 to 18.4 mol/l and preferably in a range between 1.5 to 15 mol/l. Preferably, said aqueous acid has a pH value in the range from 0 to 2. The amount of acid is adjusted to maintain an excess of acid referring to the corresponding metal (nickel or cobalt). The concentration of residual acid is varied in a range of 0.5 to 20 g/l and preferably in a range of 0.5 to 6 g/l or less.

In some variants of the process, the leaching agent is sulfuric acid, and hydrogen peroxide is used as the oxidizing agent. The concentration of hydrogen peroxide is preferably in a molar ratio range from 0.5 to 1.1 between hydrogen peroxide and sulfuric acid.

The process is performed at a temperature in the range from 20° C. up to 100° C., or preferably from 50° C. or up to the boiling point of the solution used in the process, for example at a temperature of 60° C., 70° C., 80° C., or 90° C. External heating and/or cooling can be used to maintain process temperature stability.

The reactor and associated equipment, pipes and vessels or tanks are made of a material resistant to strong acids and oxidizing agents, for example made of polymer composite, duplex stainless steel, coated steel, or polymer liners. In one embodiment, the equipment in contact with the leaching solution is made of fiber reinforced polymer.

In one embodiment, the leaching operation has a duration in the range of from minutes to several hours. For example, the reaction mixture is recycled by vigorous pumping in counter-current mode in order to achieve a good mixing and to avoid the settling of insoluble compounds. All these devices need to be sufficiently corrosion resistant and may be produced from similar materials and coatings as described for the reactor itself.

The process results in a surprisingly rapid and efficient dissolution of the electrolytically produced metal objects, for example the solid metal nickel or cobalt cathodes. A metal sulfate solution or metal chloride solution is obtained, and can be siphoned off the circulation, while fresh leaching solution and new metal objects are added, making the process a continuous one. Simultaneously, metal fines with copper deposited on them are removed from the circulation, either continuously or semi-continuously, effectively removing copper from the solution.

EXAMPLES

Example 1. Lab Scale Leaching

A lab scale equipment was assembled, comprising an acid resistant vertical column, pumps and the necessary temperature and pH sensors. The column was packed with 6 kg metallic nickel cathode plates (size 1"×1", approximately 2.5×2.5 cm. A solution of sulfuric acid was added to the column. The amount of added sulfuric acid was equal to an acid concentration of 167 g/l in a volume of 4 l. The solution of sulfuric acid was circulated through the bottom of the column bed at a rate of 5 l/min. 670 ml of 30 w-% hydrogen peroxide solution was slowly added into the column in order to avoid overheating of the column. During the addition of peroxide, the temperature of the column was kept at 80° C. After addition of hydrogen peroxide an acidic nickel sulfate solution having a nickel concentration of about 100 g/l was obtained.

A solution of sulfuric acid and hydrogen peroxide with a concentration of 167 g/l and 167 ml/l, respectively, was added at a constant rate into the circulation. The volume of the solution in the column was kept constant by removing product solution at an equal rate. The temperature in the column was kept at 80° C. by applying external heating as necessary.

The feeding rate of the sulfuric acid and hydrogen peroxide solution into the column was adjusted based on the pH of the circulating nickel sulfate solution. The feeding rate of the reagents was adjusted to a level in which the pH of the solution increased slowly towards a target pH of 2.1.

The pH was then kept constant at about pH 2.1 by adding sulfuric acid solution with a concentration of 300 g/l. Under stable leaching conditions the nickel concentration of the sulfate product solution was 100 g/l and the concentration of residual sulfuric acid was 5 g/l. During constant operation of the process a leaching rate of approximately 50 g Ni/h was achieved.

No visible formation of gases was observed under the constant leaching conditions. Thus, the leaching of the nickel cathode plates may be expressed by Equation 1:

$$H_2SO_4 + H_2O_2 + Ni(Cathode) => NiSO_4 + 2H_2O \quad (1)$$

Example 2. Pilot Scale Leaching

A pilot equipment comprising a leaching column, a mixing tank, storage tanks, and piping was constructed from a fiber-reinforced polymer material and supported by a steel frame. The set-up corresponded to the arrangement schematically shown in FIG. 1, with the exception that no feeder (9) was included. Electrolytically produced solid metal objects (nickel cathode plates) were manually added. Additionally, the solution was led into a mixing tank (not shown) after the filtration step (7) but before pump (4) in line (3). From this tank, a product solution was led to a storage tank as an overflow.

Auxiliary equipment such as peristaltic pumps, flow meters, pH sensor, oxidation-reduction potential (ORP) sensor, temperature sensors and pressure transmitters were included, as necessary. The pilot equipment was connected to heating and cooling water systems. The leaching column had a diameter of 250 mm, a bed height of 2.5 m, and a capacity for holding about 800-1200 kg cathode plates, depending on the packing density.

The chemicals used for leaching and pH adjustments were 17% technical grade sulfuric acid, 96% technical grade sulfuric acid and 35% technical grade hydrogen peroxide.

The content of sulfuric acid was analysed by titration with NaOH (aq.) in the presence of methyl orange as indicator. Titration was performed until the indicator color changed from red/pink to yellow. When the color change was not easily noticeable due to the green color of the nickel (II) sulphate, the pH was confirmed using as pH meter. For detailed chemical analysis, the sulfuric acid content was determined by alkacymetric titration with potentiometric detection of the end point.

Nickel analysis: The content of nickel in the samples was analysed by titration with EDTA (aq.) in the presence of murexide as indicator and ammonium buffer solution. Titration was performed until the indicator color changed from yellow/dark orange to violet. For detailed chemical analysis, the nickel content was determined by complexometric titration with potentiometric detection of the end point.

Measurement of pH and RedOx potential was performed using electronic pH sensors equipped with and electrode for pH and an ERPt-13 electrode for RedOx potential measurements.

The content of impurities such as chromium, zinc, aluminum, cobalt, copper, sodium and iron were determined by flame atomic absorption spectrometry (FAAS) and the sulphur content was determined using inductively-coupled plasma—atomic (optical) emission spectroscopy (ICP OES).

The leaching column was initially loaded with 842-1220 kg nickel cathodes (size 1"×1", approximately 2.5×2.5 cm).

In one experimental run, the temperature was maintained at 80° C., and the pH set to 0.4 (controlled by adding extra acid). 36% hydrogen peroxide was added at a flow rate of about 11 l/h and a mix of sulfuric acid and hydrogen peroxide was added at a flow rate of about 20 l/h. When an output of nickel sulfate solution at a concentration of 100 g/l was obtained, the pH was gradually increased from 0.4 to about 1.2. The process was operated for 8 hours, exhibiting stable conditions. Battery grade nickel sulphate solution was constantly removed, and solid metal was added, and metal fines removed.

In another experimental run, when 100 g/l nickel sulfate solution was already present in the pilot, different recirculation flow rates were investigated: 30, 40, 45, 50, 55, 60 and 65 l/h. In this experimental setup, 60 l/h was found to be the maximal flow rate, and at 65 l/h process instability was noted.

In continuous operation, at 80° C., the pilot plant produced a stable nickel concentration of 100 g/l, and the sulfuric acid concentration was maintained below 6 g/l. The results show that a viable process was achieved.

With recirculation of the leaching solution in a counter-current fashion, i.e. the solution was removed from the top of the reaction vessel (column) and returned to the bottom of the same, it was observed that the fines accumulated in the middle of the cathode bed.

Interestingly, it was also found that metallic copper was deposited on the nickel cathodes and efficiently removed together with the fines collected in the magnetic filter. Without wishing to be bound by theory, the present inventors speculate that the metallic nickel cathode bed and nickel fines inside the reaction vessel acts as a copper cleaning media. As a result, the metal sulfate solution was substantially free from copper, whereas the fines contained approximately 0.3% copper. This is particularly advantageous, as the presence of copper otherwise decreases the leaching rate.

The surprising removal of copper prevents the accumulation of copper in the column, which could otherwise be a problem in a continuous process. Copper also causes decomposition of the hydrogen peroxide, so the removal of copper makes it possible to use less hydrogen peroxide.

Without further elaboration, it is believed that a person skilled in the art can, using the present description, including the examples, utilize the present invention to its fullest extent. Also, although the invention has been described herein with regard to its preferred embodiments, which constitute the best mode presently known to the inventors, it should be understood that various changes and modifications as would be obvious to one having the ordinary skill in this art may be made without departing from the scope of the invention which is set forth in the claims appended hereto.

Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A process for preparing battery grade metal sulfate solutions, wherein electrolytically produced metal objects are introduced in a first direction and subjected to an aqueous leaching solution at an elevated temperature and acid pH in a continuous process with mixing, said leaching solution comprising at least one acid leaching agent and an oxidizing agent in liquid form, wherein said mixing is achieved by recirculating the aqueous leaching solution that is introduced in a second direction through a leaching column operating in counter-current mode, said second direction being opposite said first direction, said electrolytically produced metal objects being introduced in said first direction at a top of said leaching column while said leaching solution is being introduced in said second direction at a bottom of said leaching column, said bottom being opposite said top, and said opposing direction of introduction at said top and said bottom, respectively, and said counter-current mode resulting therefrom causing shearing and enhancing leaching.

2. The process according to claim 1, wherein the resulting battery grade metal sulfate solution has a residual sulfuric acid concentration in a range of 0-10 g/l.

3. The process according to claim 1, wherein:
the electrolytically produced metal objects are one of nickel cathode plates, squares, rounds, tubes, crowns and chippings, and
the resulting metal sulfate solution is a battery grade nickel sulfate solution.

4. The process according to claim 1, wherein:
the electrolytically produced metal objects are one of cobalt cathode plates, squares, rounds, tubes, crowns and chippings, and
the resulting metal sulfate solution is a battery grade cobalt sulfate solution.

5. The process according to claim 1, wherein the acid leaching agent is selected from one of sulfuric acid, hydrochloric acid, nitric acid, oxalic acid, and citric acid.

6. The process according to claim 1, wherein the liquid oxidizing agent is one of hydrogen peroxide, halogens, halogen compounds, citric acid, and oxalic acid.

7. The process according to claim 1, wherein the leaching solution comprises a mixture of sulfuric acid and citric acid.

8. The process according to claim 1, wherein the pH is maintained in a range of 1-6 during leaching with the oxidizing agent.

9. The process according to claim 1, wherein said oxidizing agent is hydrogen peroxide in liquid form.

10. The process according to claim 1, wherein the temperature is maintained at a temperature in a range between 50° C. and up to the boiling point of the leaching solution.

11. The process according to claim 1, further comprising a step of separation of metal fines from the recirculating leaching solution.

12. The process according to claim 11, wherein the separation step involves removal of copper wherein metallic copper is deposited on the metal fines and said fines are removed from circulation.

13. The process according to claim 1, wherein the resulting battery grade metal sulfate solution has a residual sulfuric acid concentration in a range of 0-6 g/l.

14. The process according to claim 1, wherein the acid leaching agent is at least two of sulfuric acid, hydrochloric acid, nitric acid, oxalic acid, and citric acid.

15. The process according to claim 6, wherein the halogen compounds are chlorates and perchlorates.

16. The process according to claim 1, wherein the pH is maintained in a range of 1 to 4 during leaching with the oxidizing agent.

17. The process according to claim 1, wherein the temperature is maintained at a temperature in a range between 75° C. and the boiling point of the leaching solution.

18. A process for preparing battery grade metal sulfate solutions, wherein electrolytically produced metal objects are subjected to an aqueous leaching solution at an elevated temperature and acid pH in a continuous process with mixing, said leaching solution comprising at least one acid leaching agent and an oxidizing agent pre-mixed in liquid form, wherein said mixing is achieved by recirculating the aqueous leaching solution through a leaching column operating in counter-current mode, wherein said counter-current mode causes shearing and enhances leaching, wherein said electrolytically produced metal objects are introduced at a top of the leaching column while said leaching solution is introduced at a bottom of the leaching column opposite the top, and wherein the pH is maintained in a range of 1-6 during leaching with the oxidizing agent.

* * * * *